UNITED STATES PATENT OFFICE.

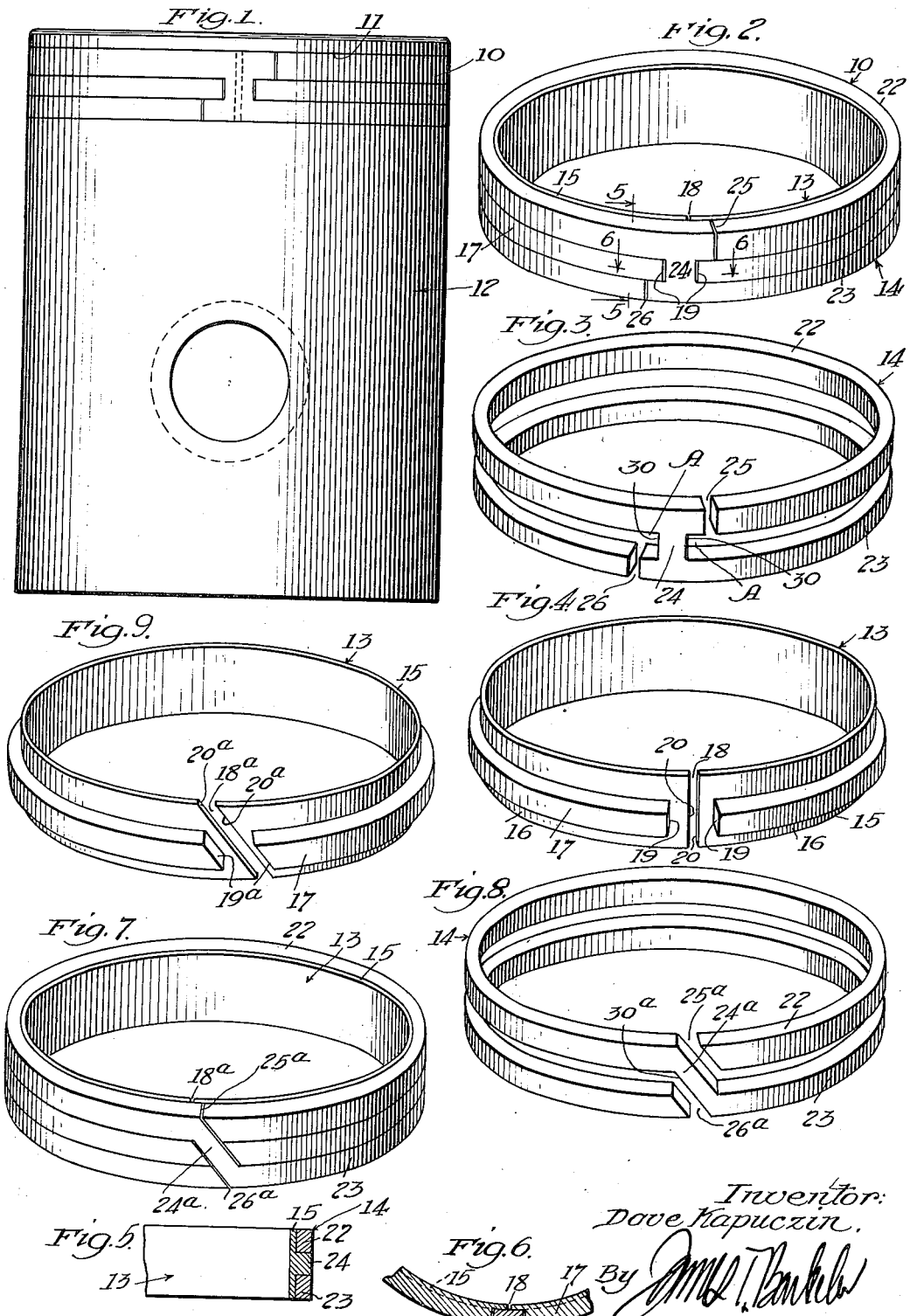

DAVE KAPUCZIN, OF LOS ANGELES, CALIFORNIA.

PISTON RING.

1,413,031. Specification of Letters Patent. Patented Apr. 18, 1922.

Application filed July 22, 1920. Serial No. 398,139.

*To all whom it may concern:*

Be it known that I, DAVE KAPUCZIN, a citizen of the United States, residing at Los Angeles, county of Los Angeles, State of California, have invented a new and useful Improvement in Piston Rings, of which the following is a specification.

This invention has to do with a piston ring of the type used in the pistons of reciprocating mechanism such as engines and it may be stated that an object of the invention is to provide a simple, inexpensive, and effective device of this character.

The ring provided by the invention is best adapted for use in connection with the piston of an internal combustion engine although it will be readily understood that it is not in any way limited to such specific application as it might advantageously be employed in similar mechanism of various forms and adapted for use in various arts. For instance, it might well be employed in steam, pneumatic, and other like machinery.

The ring can well be termed a leak-proof ring and is particularly noteworthy because of its simplicity, inexpensive construction, and effectiveness. These features are particularly important in that they make the ring valuable commercially.

Further objects and features of my invention and the means by which I effect these objects and features are explained in the following specification wherein I describe preferred embodiments of the invention and throughout which reference is had to the accompanying drawings, in which:—

Fig. 1 is a view showing a ring made in accordance with the present invention and arranged in place in a typical piston; Fig. 2 is a perspective view of the ring shown in Fig. 1 showing it as it appears alone, or removed, from the piston; Fig. 3 is a perspective view of one of the members of the ring; Fig. 4 is a perspective of the other member of the ring; Fig. 5 is a detail transverse sectional view of the ring taken as indicated by line 5—5 on Fig. 2; Fig. 6 is a somewhat enlarged detail sectional view of a part of a ring, being a view taken as indicated by line 6—6 on Fig. 2; Fig. 7 is a perspective view similar to Fig. 2 showing another form of the invention; Fig. 8 is a perspective view similar to Fig. 3 of one of the members of the form of ring shown in Fig. 7; and Fig. 9 is a perspective view similar to Fig. 4 of the other member of the form of ring shown in Fig. 7.

In Fig. 1 of the drawings numeral 10 designates the ring provided by the invention which is adapted to be carried in a groove 11 formed in the piston 12. The purpose of this figure of the drawings is merely to facilitate in setting forth the manner in which the ring 10 may be employed, and, therefore, the piston shown is of simple form and construction being adapted for use in a single acting engine and being formed with only one ring groove 11. It will be understood that the invention is not in any way limited to application in connection with a piston such as is shown in Fig. 1 as that particular piston is merely typical of devices of that general character and is set forth, as hereinabove stated, merely for purpose of illustration.

The ring 10 provided with the invention comprises, generally, two parts, or members, one a frame or carrier 13 and the other a ring member 14. The carrier and ring members cooperate, or the ring member is carried on the carrier, in a manner to form a continuous annular structure or ring adapted to be carried in a groove 11 and capable of considerable variation in size. The carrier and ring member when together practically completely fill the groove 11, and when in their natural condition are of such diameter as to project somewhat from the groove 11. However the ring is capable of being contracted or reduced in diameter until its outer diameter is slightly smaller than, or is the same as, the diameter of the piston 12. With the ring mounted and operatable in this manner it will be readily understood how it engages and forms a tight joint with the wall of the cylinder in which the piston operates.

In the form of the invention shown in Figs. 1, 2, 3, 4 and 6 the carrier 13 comprises a comparatively broad thin ribbon like annular ring 15 from which projects a rib 17. The ring 15 is adapted to fit and adapt itself to the bottom portion of the groove 11 and is made sufficiently wide to extend completely across, or between the, side walls of the groove 11. The ring 15 is not split or cut at 18 so that it is a continuous member. The cut 18 permits of the carrier being made of such size as to normally fit rather close to the bottom of the groove 11 and to be sprung to permit of its being placed in, or removed from the groove 11. The cut 18 in this form of the invention is formed in the ring 15 so that the ends 20 of the ring are substantially square, as shown in the drawings. The rib 17 is substantially square in cross sectional configuration, extends longitudinally around the outer face 16 of the ring 15, and is preferably formed integral with the ring 15. In practice the rib 17 is preferably a continuous uniform ring-like member arranged centrally on the face 16, of the ring 15, and of such length as to extend practically completely around the ring 15. The ends 19 of the rib are preferably square or parallel with the ends 20 of the ring 15 and extend almost to the ends 20, as clearly shown in Fig. 4 of the drawings. With this arrangement of the rib 17 on the ring 15, the ends 20 of the ring 15 may be together, or practically together, without allowing the ends of the rib to be, or come, together. The reason and advantage for this particular construction will be understood from the description to follow. It may be said that the ring 15 and rib 17 together form seats at opposite sides of the carrier 13 to receive the ring member 14.

The ring member 14 comprises two rings 22 and 23 connected or jointed by a neck or web 24. The rings 22 and 23 are connected and held together by the web 24 to be concentric with each other and to be spaced apart, as clearly shown in Fig. 3. The spacing of the rings 22 and 23 is uniform at all points and the width of the space between the rings 22 and 23 is just equal to the width of the rib 17. The two rings are preferably substantially square, and of equal size, in cross-sectional configuration. The width of each of the two rings 22 and 23 is equal to the width of the portions of face 16, of ring 15, on either side of the rib 17. With this proportioning of parts the total width of the ring member 14 is equal to that of the ring 15.

The web 24, which holds the rings 22 and 23 together, is a straight member extending squarely between the two rings, as clearly shown in Fig. 3. In practice the rings 22 and 23 and the web 24 may be formed integrally, thereby making the ring member a solid and continuous structure.

The web 24 is a simple and effective means which may be employed for connecting the rings 22 and 23. It acts as means to hold the rings 22 and 23 in the seats formed by the carrier and prevents the rings 22 and 23 from turning or moving longitudinally relative to each other.

The rings 22 and 23 are not continuous rings, but are formed with splits or cuts 25 and 26, respectively. It will be noted in the drawings, particularly in Fig. 3 of the drawings, that the cuts 25 and 26, in the rings 22 and 23, are on opposite sides of the neck 24, and that although they are in the vicinity of the neck 24, they are not extremely close to or at, the neck 24. This particular arrangement or construction is more or less important as will be understood from the following description as it provides recesses A to receive the ends 19 of the web 17. The cuts 25 and 26 may be formed in the rings 22 and 23 in any suitable manner, for instance, as shown in the drawings, they may be formed straight across the rings so that the ends of the rings are square.

From the foregoing description it will be readily understood how the ring member 14 may be arranged on the carrier 15 so that the rings 22 and 23 are at the sides of rib 17 and so that the neck 24 is between the ends 19 of the rib 17. With the rib 17 and the rings 22 and 23 formed to be the same diameter, it will be readily understood how they co-operate or fit together to form a ring structure presenting an even continuous outer face of a width equal to the width of the ring 15. When the ring member 14 and rib carrier 13 are arranged together, the rib 17 fits between and completely fills the space between the rings 22 and 23 while the rings 22 and 23 fit over and cover the face 16, of ring 15 except where it is covered by the web 24. The end portions of the rib 17 extend past the cuts 25 and 26 in the rings 22 and 23, into the recesses A and approach very closely the side walls 30 of the web 24.

In Figs. 3 and 4 of the drawings the ring member and carrier are shown in their natural or normal condition. When the ring member is in this condition the cuts 25, 26 and 18 are comparatively wide. In Figs. 1 and 2 of the drawings the ring is shown in its working condition or as it is when it is in place in a piston and is bearing or fitting against a cylinder wall. In these last mentioned figures it will be noted that the cuts 18, 25 and 26 are comparatively small or narrow and, that the ends 19 of the rib 17 very closely approach the walls 30 of the web 24. When the ring is in this condition there are no large or spacious openings in any part of it which might permit of, or lead to, leakage past the ring.

In the form of the invention shown in Figs. 7, 8 and 9 the carrier 13, shown independently in Fig. 9, is practically the same as the carrier in the other form of the invention except that the opening or cut 18$^a$ is formed diagonally, or at an angle. The rib 17 is and acts substantially as the ring 17 in the other form of the invention and is the same as the other ring in all respects except as to its ends 19$^a$ are formed at an angle and are preferably parallel with the ends 20$^a$ of the ring 15.

The ring member 14, shown independently in Fig. 8, resembles generally the ring member of the other form of the invention and differs from the ring member of the other form of the invention in that the web 24ª extends diagonally between the rings 22 and 23, and that the cuts or openings 25ª and 26ª in the rings 22 and 23 are formed at the neck 24ª and at an angle to be parallel with the neck 24ª.

When the ring member and the carrier are arranged together, as shown in Fig. 7, the diagonal ends 19ª of the ribs 17 are adapted to approach very closely and be parallel with the diagonal side walls 30ª of the rib 17, and the diagonal ends of the rings 22 and 23 are adapted to come closely together and be parallel with both the side walls 30ª of the web 24ª and the ends 19ª of the rib 17.

From the foregoing disclosure of the invention it will be readily understood how it forms or provides a continuous piston ring which is capable of being varied in size a sufficient amount to adapt itself to a cylinder. In other words, the manner in which the ring member and carrier co-operate provides a ring without an open or broken part such as is common in devices of this character.

It will be understood of course that, as far as the present invention is concerned, the ring member and carrier may be each formed as either integral cast or forged members or as built-up or assembled members and further, that either of the members may be made of any suitable or desirable material, although it may be stated that it is preferred that they be cast iron, or the like.

A particular advantage gained by the construction provided by the invention is uniform or equal flexibility or expansibility throughout the entire length of the ring structure, and also a form of device which can be easily manufactured. These features are due mainly to the fact that both of the members which form the ring structure are uniform in size and thickness in and throughout all their parts.

Having herein set forth only preferred embodiments of my invention, I do not wish to limit myself to the particular details hereinabove set forth, but wish to reserve to myself any variations or modifications that may present themselves to those skilled in the art or that may fall within the scope of the following claims.

Having described a preferred form of my invention, I claim:

1. In a piston ring, two spaced ended rings, a web between said rings to hold them in spaced relation, and an ended ring arranged to fill the space between said rings and so that the web is between its ends.

2. In a piston ring, two ended rings, a web between said rings to hold them in spaced relation, and another ended ring arranged between said first mentioned rings so that the web is between its ends and so that it has continuous parts at the ended parts of said first mentioned rings.

3. In a piston ring, two ended rings, a web between said rings to hold them in spaced relation and so that their ended portions are at different points circumferentially, and an ended ring arranged between said rings so that the web is between its ends.

4. In a piston ring, two ended rings, a web between said rings to hold them in spaced relation and with their ended portions on opposite sides of it, and an ended ring between said rings so that the web is between its ends.

5. In a piston ring, two ended rings, a web between said rings to hold them in spaced relation and with their ended portions on opposite sides of it, and an ended ring between said rings to have continuous parts at the ended portions of said rings and so that the web is between its ends.

6. In a piston ring, two ended rings, a web between said rings to hold them in spaced relation and so that their ended portions are on opposite sides of and spaced from it, and an ended ring between said rings so that the web is at its ended portion.

7. In a piston ring, two ended rings, a web between said rings to hold them in spaced relation and so that recesses are formed on opposite sides of it, and an ended ring between said rings with its ends extending into said recesses.

8. In a piston ring, an annular ended carrier, an ended ring in fixed position on said carrier with its ends at opposite sides of the break in the carrier, two ended rings arranged on the carrier at opposite sides of the fixed ring, and a web connecting the said two ended rings and arranged between the ends of the fixed ring and covering the break in the carrier.

9. In a piston ring, an integral member comprising a carrier and an ended ring on the carrier, and a second integral member comprising two ended rings adapted to be arranged on opposite sides of the ring of the first mentioned member and a web connecting said ended rings and adapted to be arranged between the ends of the ring of the first mentioned member.

10. In a piston ring, a ring-like carrier, an ended ring carried by said carrier, two ended rings arranged on opposite sides of said first mentioned ended ring, and a connecting member between the said two ended rings lying between the ends of said first mentioned ended ring.

11. In a piston ring, two ended rings, a connecting member extending between said rings, and another ended ring arranged between said first mentioned rings so that the connecting member is between its ends.

12. A piston ring comprising an expansible ring shaped member having seats at opposite sides, two expansible rings one carried in each seat, and a member connecting said two expansible rings.

13. A piston ring comprising an expansible ring shaped member having seats at opposite sides, two expansible rings one carried in each seat, and a member connecting said two expansible rings to hold them in the seats and against relative longitudinal movement.

14. A piston ring comprising an expansible ring shaped member having seats at opposite sides, and two connected independently expansible members one arranged in each seat.

15. In a piston ring, an ended ring shaped carrier, and ended ring fixed centrally on the carrier with its ends at opposite sides of the break in the carrier, two independently expansible ended rings arranged at opposite sides of said first mentioned ring, and a web extending between the ends of the first mentioned ring, covering the break in the carrier, and connecting the said two ended rings with their breaks at opposite sides of it and not in register with the break in the carrier.

In witness that I claim the foregoing I have hereunto subscribed my name this 13th day of July, 1920.

DAVE KAPUCZIN.

Witness:
VIRGINIA BERINGER.